(12) United States Patent
Kalyanaraman et al.

(10) Patent No.: US 8,990,371 B2
(45) Date of Patent: *Mar. 24, 2015

(54) INTERCONNECTING DATA CENTERS FOR MIGRATION OF VIRTUAL MACHINES

(75) Inventors: Shivkumar Kalyanaraman, Bangalore (IN); Kalapriya Kannan, Bangalore (IN); Vijay Mann, Haryana (IN); Anil Kumar Vishnoi, Haryana (IN)

(73) Assignee: International Business Machines Corporation, Armonk, NY (US)

( * ) Notice: Subject to any disclaimer, the term of this patent is extended or adjusted under 35 U.S.C. 154(b) by 446 days.

This patent is subject to a terminal disclaimer.

(21) Appl. No.: 13/362,165

(22) Filed: Jan. 31, 2012

(65) Prior Publication Data

US 2013/0198352 A1    Aug. 1, 2013

(51) Int. Cl.
*G06F 15/173* (2006.01)
*H04L 29/08* (2006.01)
(52) U.S. Cl.
CPC ..................................... *H04L 67/34* (2013.01)
USPC ............................. 709/223; 709/221; 709/226
(58) Field of Classification Search
CPC ........................ G06F 2009/4557; H04L 67/34
USPC ........................................ 709/223, 221, 226
See application file for complete search history.

(56) References Cited

U.S. PATENT DOCUMENTS

| 7,761,573 | B2 | 7/2010 | Travostino et al. | |
| 8,194,680 | B1 * | 6/2012 | Brandwine et al. | 370/398 |
| 2008/0186990 | A1 | 8/2008 | Abali et al. | |
| 2009/0106409 | A1 | 4/2009 | Murata | |
| 2010/0071025 | A1 | 3/2010 | Devine et al. | |
| 2010/0169467 | A1 * | 7/2010 | Shukla et al. | 709/220 |
| 2010/0287548 | A1 | 11/2010 | Zhou et al. | |
| 2010/0322255 | A1 | 12/2010 | Hao et al. | |
| 2011/0145380 | A1 | 6/2011 | Glikson et al. | |
| 2011/0161851 | A1 | 6/2011 | Barber et al. | |
| 2011/0179415 | A1 | 7/2011 | Donnellan et al. | |

(Continued)

FOREIGN PATENT DOCUMENTS

| CN | 1571358 | 1/2005 |
| CN | 102185774 | 9/2011 |

(Continued)

OTHER PUBLICATIONS

Mysore, R., "PortLand: A Scalable Fault-Tolerant Layer 2 Data Center Network Fabric," in ACM SIGCOMM, Aug. 17-21, 2009, 12 pages, Barcelona, Spain.

(Continued)

*Primary Examiner* — Hitesh Patel
(74) *Attorney, Agent, or Firm* — Ference & Associates LLC

(57) ABSTRACT

Methods and arrangements for facilitating virtual machine migration across data centers. A virtual machine is designated for migration from a first data center to a second data center, the virtual machine including a real identifier. A pseudo identifier is assigned to the virtual machine, and the pseudo identifier is mapped to the real identifier at a controller of the first data center. The real identifier is replaced in a data packet with the pseudo identifier for a routing task. Communication is maintained between the controller of the first data center and a controller of the second data center, and the controllers are synchronized to update a correct location of the virtual machine. The virtual machine is migrated from the first data center to the second data center.

10 Claims, 3 Drawing Sheets

(56) References Cited

U.S. PATENT DOCUMENTS

| | | | |
|---|---|---|---|
| 2012/0173757 A1* | 7/2012 | Sanden | 709/238 |
| 2013/0139155 A1* | 5/2013 | Shah | 718/1 |
| 2014/0105213 A1* | 4/2014 | A K et al. | 370/392 |

FOREIGN PATENT DOCUMENTS

| | | |
|---|---|---|
| CN | 102209024 | 10/2011 |
| EP | 2618535 A1 | 7/2013 |
| WO | WO2013113264 A1 | 8/2013 |

OTHER PUBLICATIONS

Travostino, F., "Seamless Live Migration of Virtual Machines over the MAN/WAN", Elsevier Future Generation Computer Systems, vol. 22, Issue 8, Oct. 2006, 10 pages, Elsevier Science Publishers B.V., Amsterdam, The Netherlands.

Bradford, Robert, et al., "Live Wide-Area Migration of Virtual Machines Including Local Persistent State," VEE'07, Proceedings of the 3rd International Conference on Virtual execution environments, San Diego, California, USA, Jun. 13-15, 2007, pp. 169-179, ACM, New York, New York.

Harney, Eric, et al., "The Efficacy of Live Virtual Machine Migrations Over the Internet," VTDC'07, Proceedings of the 2nd International Workshop on Virtualization Technology in Distributed Computing, Reno, Nevada, USA, Nov. 12, 2007, 7 pages, Article No. 8, ACM, New York, New York, USA.

Silvera, Ezra, et al., "IP Mobility to Support Live Migration of Virtual Machines Across Subnets," SYSTOR'09 Proceedings of SYSTOR 2009: The Israeli Experimental Systems Conference, Haifa, Israel, May 4-6, 2009, 10 pages, Article No. 13, ACM, New York, New York, USA.

Pu, Yan, et al., "Cloud Rack: Enhanced Virtual Topology Migration Approach with Open vSwitch," 2011 International Conference on Information Networking (ICOIN), Barcelona, Spain, Jan. 26-28, 2011, pp. 160-164, IEEE, Piscataway, New Jersey, USA.

Hao, Fang, et al., "Enhancing Dynamic Cloud-based Services using Network Virtualization," ACM SIGCOMM Computer Communication Review, Jan. 2010, pp. 67-74, vol. 40, Issue 1, ACM, New York, New York, USA.

Li, Qin, et al., "HyperMIP: Hypervisor controlled Mobile IP for Virtual Machine Live Migration across Networks," 11th IEEE High Assurance Systems Engineering Symposium, Nanjing, Jinagsu, China, Dec. 3-5, 2008, pp. 80-88, IEEE Computer Society, Piscataway, New Jersey, USA.

Boughzala, Bochra et al., "OpenFlow Supporting Inter-Domain Virtual Machine Migration," Eighth International Conference on Wireless and Optical Communications Networks (WCON), Paris, France, May 24-26, 2011, 7 pages, IEEE, Piscataway, New Jersey, USA.

Mysore, Radhika N., et al., "Portland: A Scalable Fault-Tolerant Layer 2 Data Center Network Fabric," Proceedings of the ACM SIGCOMM 2009 Conference on Data Communication, Barcelona, Spain, Aug. 17-21, 2009, pp. 39-50, ACM, New York, New York, USA.

Greenberg, Albert et al., "VL2: A Scalable and Flexible Data Center Network," Proceedings of the ACM SIGCOMM 2009 Conference on Data Communication, Barcelona, Spain, Aug. 17-21, 2009, pp. 51-62 ACM, New York, New York, USA.

International Searching Authority, Search Report for International Application PCT/CN2013/070861, Apr. 3, 2013, 1 page (CN).

* cited by examiner

INTERCONNECTING DATA CENTERS FOR MIGRATION OF VIRTUAL MACHINES

BACKGROUND

Today, many enterprises run applications on virtual machines (VMs). VM mobility, both live and offline, can provide enormous flexibility and also bring down operating expense costs. However, both live and offline migration of VMs is still typically limited to within a local network because of the complexities associated with cross subnet live and offline migration. These complexities mainly arise from the hierarchical addressing used by various layer 3 routing protocols. For cross data center VM mobility, virtualization vendors usually require that the network configuration of the new data center where a VM migrates must be similar to that of the old data center. This severely restricts widespread use of VM migration across data center networks.

For offline migration, some limitations can be overcome by reconfiguring IP addresses for the migrated VMs. However, even this effort is non-trivial and time consuming as these IP addresses are embedded in various configuration files inside these VMs.

BRIEF SUMMARY

In summary, one aspect of the invention provides a method comprising: designating a virtual machine for migration from a first data center to a second data center, the virtual machine including a real identifier; assigning a pseudo identifier to the virtual machine; mapping the pseudo identifier to the real identifier at a controller of the first data center; replacing the real identifier in a data packet with the pseudo identifier for a routing task; maintaining communication between the controller of the first data center and a controller of the second data center, and synchronizing the controllers to update a correct location of the virtual machine; and migrating the virtual machine from the first data center to the second data center.

Another aspect of the invention provides an apparatus comprising: at least one processor; and a computer readable storage medium having computer readable program code embodied therewith and executable by the at least one processor, the computer readable program code comprising: computer readable program code configured to designate a virtual machine for migration from a first data center to a second data center, the virtual machine including a real identifier; computer readable program code configured to assign a pseudo identifier to the virtual machine; computer readable program code configured to map the pseudo identifier to the real identifier at a controller of the first data center; computer readable program code configured to replace the real identifier in a data packet with the pseudo identifier for a routing task; computer readable program code configured to maintain communication between the controller of the first data center and a controller of the second data center, and synchronize the controllers to update a correct location of the virtual machine; and computer readable program code configured to migrate the virtual machine from the first data center to the second data center.

An additional aspect of the invention provides a computer program product comprising: a computer readable storage medium having computer readable program code embodied therewith, the computer readable program code comprising: computer readable program code configured to designate a virtual machine for migration from a first data center to a second data center, the virtual machine including a real identifier; computer readable program code configured to assign a pseudo identifier to the virtual machine; computer readable program code configured to map the pseudo identifier to the real identifier at a controller of the first data center; computer readable program code configured to replace the real identifier in a data packet with the pseudo identifier for a routing task; computer readable program code configured to maintain communication between the controller of the first data center and a controller of the second data center, and synchronize the controllers to update a correct location of the virtual machine; and computer readable program code configured to migrate the virtual machine from the first data center to the second data center.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
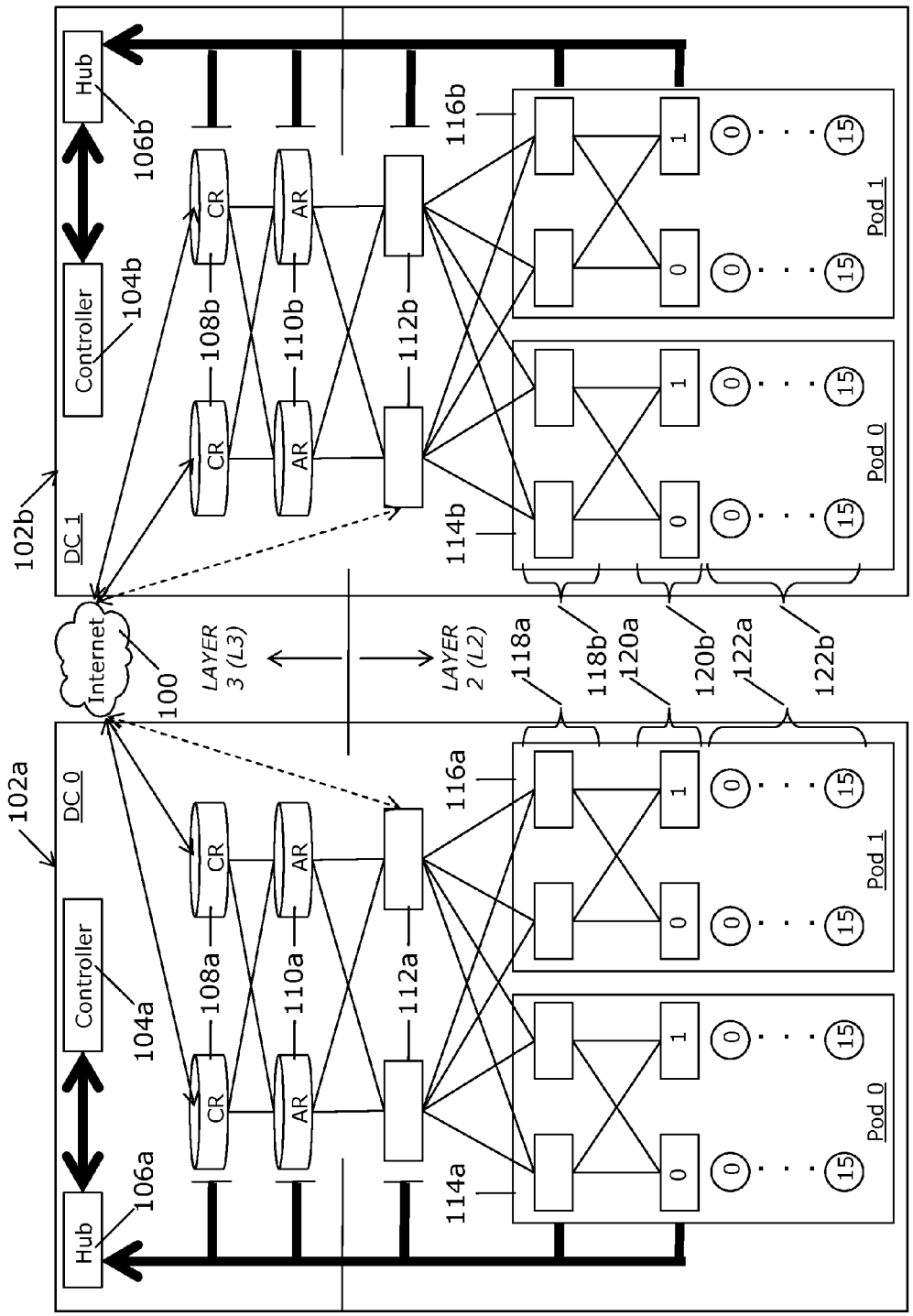
FIG. 1 schematically illustrates a system architecture.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art will recognize, however, that the various embodiments of the invention can be practiced without at least one of the specific details, or with other methods, components, materials, et cetera. In other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected exemplary embodiments of the invention as claimed herein.

It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The disclosure now turns to FIG. 1. It should be appreciated that the processes, arrangements and products broadly illustrated therein can be carried out on or in accordance with essentially any suitable computer system or set of computer systems, which may, by way of an illustrative and non-restrictive example, include a system or server such as that indicated at 12' in FIG. 2. In accordance with an example embodiment, most if not all of the process steps, components and outputs discussed with respect to FIG. 1 can be performed or utilized by way of a processing unit or units and system memory such as those indicated, respectively, at 16' and 28' in FIG. 2, whether on a server computer, a client computer, a node computer in a distributed network, or any combination thereof.

In accordance with at least one embodiment of the invention, there is broadly contemplated herein an arrangement for providing a network fabric that provides layer agnostic and seamless live and offline VM mobility across multiple data centers. In so doing, several technical challenges are addressed and overcome, especially in confronting a problem of having VMs to preserve their original layer 3 identity (i.e. their IP address).

Generally, it is recognized that VMs should preserve their original layer 3 network addresses (i.e. the IP addresses) as they migrate from one network to another. For live migrations, preserving the IP address is important in ensuring that ongoing TCP (transmission control protocol) connections do not break and seamless connectivity is maintained. In case of offline migrations, preserving the IP addresses is important since multi-tier applications connect to each other using these IP addresses and their connectivity would break if IP addresses are modified. Manual or automatic reconfiguring of IP addresses for the migrated VMs can be non-trivial and time consuming as these IP addresses are embedded in various configuration files inside these VMs. However, preserving the original IP addresses is challenging as the IP address range for the migrated VMs might be different (different subnet or different class) from that of the new data center network where these VMs are being migrated to. This poses a problem in post migration routing of packets at network layer 3 since layer 3 routing protocols (such as OSPF, or Operation Shortest Path First) use hierarchical addressing, where addresses are matched based on longest prefix (subnet id) match. Migration across a layer 3 boundary breaks this hierarchy. As a result, IP addresses can no longer be used for routing packets since any IP address can reside anywhere across the multiple data centers and an alternate form of addressing thus needs to be used for routing packets at layer 3.

It is additionally recognized that the various layer 3 firewalls at a given data center may block traffic from a particular VM when it moves outside the same data center. To avoid this, it is desirable that the communication across data centers be handled at layer 2 without requiring layer 2 semantics of broadcast and discovery. In other words, cross data center traffic should be "routed" at layer 2 in a way similar to layer 3 routing.

Further, it is recognized that ARP (address resolution protocol) requests are generally generated from the hosts either for the destination (if the destination is in the same network) or for the default gateway or the first hop router (if destination is on a different network). (The terms "host" and "VM" or "virtual machine" can be considered to be interchangeable herein.) However, the determination of the network id is based on the subnet mask and current IP address of a VM. When VMs are migrated across a subnet, the default gateway or the first hop router it is connected to will have a completely different IP address than the one that is specified in its network configuration settings.

Moreover, in connection with "north-south" traffic, or communication with external clients, it is recognized that traffic to (or from) a migrating VM may have to traverse a layer 3 boundary either within a data center due to presence of multiple subnets (and routers) or because of external clients that communicate directly with a VM inside the data center (referred to as north south communication). This is a problem due to the hierarchical addressing used by layer 3 routing protocols as mentioned above.

Additionally, it is recognized that live virtual machine mobility generally requires the source and target physical machines to be in the same layer 2 broadcast domain. A single broadcast domain is required so that the target hypervisor (or virtual machine monitor) where the VM is migrating can announce the new location of the VM through gratuitous ARP (GARP) or reverse ARP (RARP) messages (VMware generally uses RARP messages). A layer 3 boundary or a different subnet breaks the broadcast domain (RARP and GARP messages do not travel across layer 3 boundaries). A new mechanism that maintains the current location of a VM and updates it regularly upon migration is desirable. Furthermore, the new mechanism should also be able to redirect queries about the location to itself and be able to announce the new location to all the network elements if required. It is desired that the broadcast traffic generated as a result of this state maintenance should be minimal since it can congest the network.

FIG. 1 schematically illustrates a system architecture in accordance with at least one embodiment of the invention. Shown are two data centers, 102*a/b* in communication with the internet (100); for further reference purposes, these can also be referred to as DC 0 and DC 1, respectively. Each data center 102*a/b*, respectively, includes a network controller 104*a/b* which, via a corresponding hub 106*a/b*, is connected to all the routers and switches in the data center network. Each network controller 104*a/b* forms the centralized control plane of its data center network and has the ability to install rules on all routers and switches according to which incoming packets can be modified or routed. Shown also are layers 2 and 3 as understood herein (which also can be referred to as L2 and L3). Each data center 102*a/b*, respectively, includes L3 core routers 108*a/b*, L3 access routers 110*a/b* and L2 cores switches 112*a/b*. Each data center 102*a/b* also includes two pods 114*a*/116*a* and 114*b*/116*b*, respectively and, within each data center 102*a/b*, can further be referred to as Pod 0 and Pod 1, respectively. As shown, each pod 114*a/b* and 116*a/b* includes L2 aggregate switches 118*a/b* and ToR (top of rack) switches 120*a/b*. Each ToR switch 120*a/b* can be labeled with a 0 or 1. Virtual machines 122*a/b* are associated with each ToR switch 120*a/b* and can be further labeled here (for reference purposes) from 0 to 15.

In accordance with at least one embodiment of the invention, each VM 122a/b is assigned a pseudo MAC (media access control address), or PMAC, as well as a pseudo IP address (PIP). Both PMACs and PIPs are location identifiers and have the network topological information embedded in them. While PIPs help in ensuring that all traffic to migrated VM's across layer 3 boundaries can be routed seamlessly, PMACs help in ensuring that the connectivity across data centers for east-west traffic (i.e. traffic originated from one data center to another) can be maintained at layer 2 (to avoid firewall reconfiguration issues) and traffic at layer 2 can also be "routed" using longest prefix match of PMACs (which in turn helps in ensuring that the number of rules required at each layer 2 switch are kept small).

In accordance with at least one embodiment of the invention, a controller 104a/b assigns a 48 bit Pseudo MAC (PMAC) to each host or virtual machine 122a/b of the form: dcid.pod.position.port.vmid where dcid (8 bits) is the DC identifier, pod (16 bits) is a pod identifier relating to the pod (114a/b or 116a/b) where the ToR switch (120/b) resides, position (8 bits) identifies the ToR switch's position within the pod, port (8 bits) is the port number on the ToR switch to which the physical host is directly connected, and vmid (8 bits) is the VM identifier on a particular host. 32 bit PIPs embed location as follows: dcid.subnetid.hostid; where dcid (8 bits) is the DC identifier, and the subnetid and hostid can occupy the remaining 24 bits as required using Classless Internet Domain Routing (CIDR).

In accordance with at least one embodiment of the invention, layer 3 routers or gateways are also assigned a PMAC as well as PIPs for all their interfaces (core routers 108a/b, which are directly connected to the Internet, are assigned an external IP in addition to the PIPs). These PMACs and PIPs remain fixed, while PMACs and PIPs assigned to hosts (or VMs) keep on changing based on their current location (and any migrations). Within a data center 102/ab, packets are forwarded at layer 2 using PMACs until each needs to cross a layer 3 boundary, at which point it is routed using PIPs and may again eventually be delivered to the destination using PMACs. Most of the PMAC and PIP assignment takes place during ARP resolution.

In accordance with at least one embodiment of the invention, ARP requests as well as other packets destined to other data centers (indicated by PMAC), are routed to specific encapsulation switches (at layer 2) that tunnel the packet to the destination data center (DC) where a similar encapsulation switch decapsulates it and routes based on PMAC. Tunneling the packets at layer 2 helps in ensuring that the various layer 3 firewalls at a given data center 102a/b will not require reconfiguration to allow traffic from a particular VM.

In accordance with at least one embodiment of the invention, as soon as a layer 2 switch or a layer 3 router joins the network, the controller 104a/b gets a notification and, in turn, determines if the switch is an ingress switch (i.e. a ToR) and if it is, it installs a rule to redirect all ARP requests to the controller 104a/b. (An ARP request can, e.g., be of the form "Who has 10.0.0.1?") A single rule based on layer 2 protocol type (0x806 for ARP) is installed at all Top-of-Rack (TOR) switches 120a/b; this can be referred to as rule R1. Note that ARP requests are generated from the hosts (or VMs) either for the destination (if the destination is in the same network) or for the default gateway or the first hop router (if destination is on a different network) and the determination of the network id is based on the configured subnet mask and current IP address of a VM 122a/b. For the same subnet ARP queries, the controller can easily respond with the corresponding PMAC, since the controller maintains, a mapping table that maps real IPs and actual MACs (AMACs) of all hosts within its DC to their PIPs and PMACs. The controller may read these mappings statically from a file or dynamically learn them using a protocol such as Location Discovery Protocol (LDP) (see, e.g., R. Mysore et al., "PortLand: A Scalable Fault-Tolerant Layer 2 Data Center Network Fabric," in ACM SIGCOMM, August 2009.). A controller 104a/b here will also know the identifier (real IP, PIP, AMAC and PMAC) for controllers in other DCs. If a controller 104a/b determines that a particular ARP requests is for a host (or VM) that is not mentioned in its mapping table, it broadcasts the ARP requests to all other controllers. Only the controller that has the corresponding entry for the real IP in its mapping table, responds with the PMAC to the first controller.

In accordance with at least one embodiment of the invention, the first controller (whether 104a or 104b) then caches the PMAC entry in its table (along with IP, and PIP) and also tags it as "NOMAC" for AMAC, indicating that this is an entry for a VM, that is in a remote data center. At the same time, the remote controller also installs a rule on the destination ToR 120a/b to which the destination is directly connected, to replace the PMAC with the actual MAC (AMAC) (this rule can be referred to as R2). Since a ToR 120a/b is usually connected to not more than 40 hosts, this results in a maximum of 40 rules (one for each host 122a/b) at each ToR 120a/b. The controller also installs a rule on the ingress (first hop) ToR 120a/b to replace the real IP with a pseudo IP (PIP) and on the egress (last hop) ToR 120a/b to replace the PIP with the real IP of all directly connected hosts 122a/b (these rules can be referred to as R3 and R4, respectively). This might create a large number of rules of type R3 at each ingress ToR 120a/b since, theoretically, a host can talk to any other host in the network and this can potentially result in as many rules as there are hosts or VMs (122a/b) in the network. However, this is unlikely in practice, and sufficient time will likely be readily available for old rules to expire and new rules to be installed.

In accordance with at least one embodiment of the invention, if a controller 102a/b determines that the ARP request is for the default gateway (and not for a destination host) based on its host mapping table (or by broadcasting the ARP request to controllers in other data centers), it responds back with a special MAC address (e.g., "00:00:00:00:00:00"). Next, when the first IP packet with that special MAC address arrives at the ToR in question (120a/b), it is redirected again to the controller 104a/b (since there is no rule installed for the special MAC), and the controller 104a/b installs a rule at the ToR, 120a/b to match packets with the special MAC and the given IP, and to replace the special MAC with the corresponding destination PMAC (for the given IP), as well as to replace the real IP with the PIP (this rule can be referred to as R5). This ensures that subsequent packets to that destination address (which has an IP address of a different subnet) now contain the correct PMAC and packets can be forwarded in layer 2 based on that PMAC.

In accordance with at least one embodiment of the invention, by way of an illustrative and non-restrictive example, it may be possible that a packet can not be delivered to the destination PMAC without traversing an access router 110a/b, i.e., a layer 3 boundary. Once the access router 110a/b receives a packet from a layer 2 core switch 112a/b, routing can now happen based on the PIP contained in the packet. If the router determines 110a/b that the packet is for an external data center, it discontinues layer 3 routing and sends the packet straight to the corresponding encapsulation switch (based on a pre installed static rules based on PIPs or PMACs). In this case, essentially any layer 2 core switch (112*a/b*) can act as an encapsulation switch, and the routing which bypasses layer 3 is indicated by the dashed connecting arrows in FIG. 1.

In accordance with at least one embodiment of the invention, with regard to north-south traffic, it can be noted that communication with external clients' real IPs are unique and may be publicly visible; external clients (outside the data center) communicate to VMs 122*a/b* using the real IP. As such, here a core router 108*a/b* will receive the packet with the real IP. Since there will be no rule installed on the core router 108*a/b*, it will redirect it to the controller 104*a/b* to find out the PIP. The controller 104*a/b* will then respond back with the correct PIP and PMAC (after finding it either in its own mapping or after consulting other controllers) and also install a rule to replace the given real IP with PIP, and AMAC with PMAC (this rule can be referred to as R6). If it is not a directly connected machine, based on PIP, the core router 108*a/b* routes to the appropriate access router 110*a/b* within the DC 102*a/b* or to the encapsulation switch (which can be a layer 2 core switch 112*a/b* as discussed above) if the destination is in another DC 102*a/b*. If it is a directly connected machine, routing then proceeds based on the PMAC.

In accordance with at least one embodiment of the invention, once a VM 122*a/b* migrates to a target host, the hypervisor (or virtual machine monitor) on the target host announces the new location of the VM by sending out a broadcast gratuitous ARP (GARP) or reverse ARP (RARP) message. This RARP or GARP message is redirected to the controller 104*a/b* (through the rule R1 for redirecting all ARP messages installed earlier). The controller 104*a/b*, upon receiving a RARP or GARP, executes four steps, as follows. First, it checks if the migrated machine has migrated within its own data center 102*a/b*. If it is an intra data center migration, it goes to the next step, else it sends a RARP/GARP broadcast to all other controllers, and the controller 104*a/b* where the VM 122*a/b* was located earlier responds back with a RARP response containing the old PMAC, AMAC and the real IP. In the next step, the controller 104*a/b* then assigns the VM 122*a/b* a new PMAC and a PIP, and adds an entry in its mapping table with the real IP, new PIP, AMAC and the new PMAC. If it already has an entry for the IP, it just updates its replacing NOMAC with AMAC, and old PMAC and old PIP with new PMAC and new PIP. Thence, the controller 104*a/b* installs new rules (R2 and R4) on the directly connected ToR switch 120*a/b* of the VM 122*a/b* to replace the PMAC with AMAC, and PIP with real IP for any incoming packets. It also updates any other rules (of type R3 or R5) with the updated PMAC and PIP. Finally, the controller 104*a/b* sends a Controller ARP update (which can be referred to as a CARP update) to all other controllers as a RARP message specifying the old PMAC, new PMAC, the real IP, and the new PIP. All other controllers then either delete rules (of type R2 or R4 in the original DC) or update existing rules (of type R3 or R5) with new PMAC and new PIP. Each controller 104*a/b* also sends a GARP update to update any stale ARP cache mappings that hosts may have.

Figure 2:
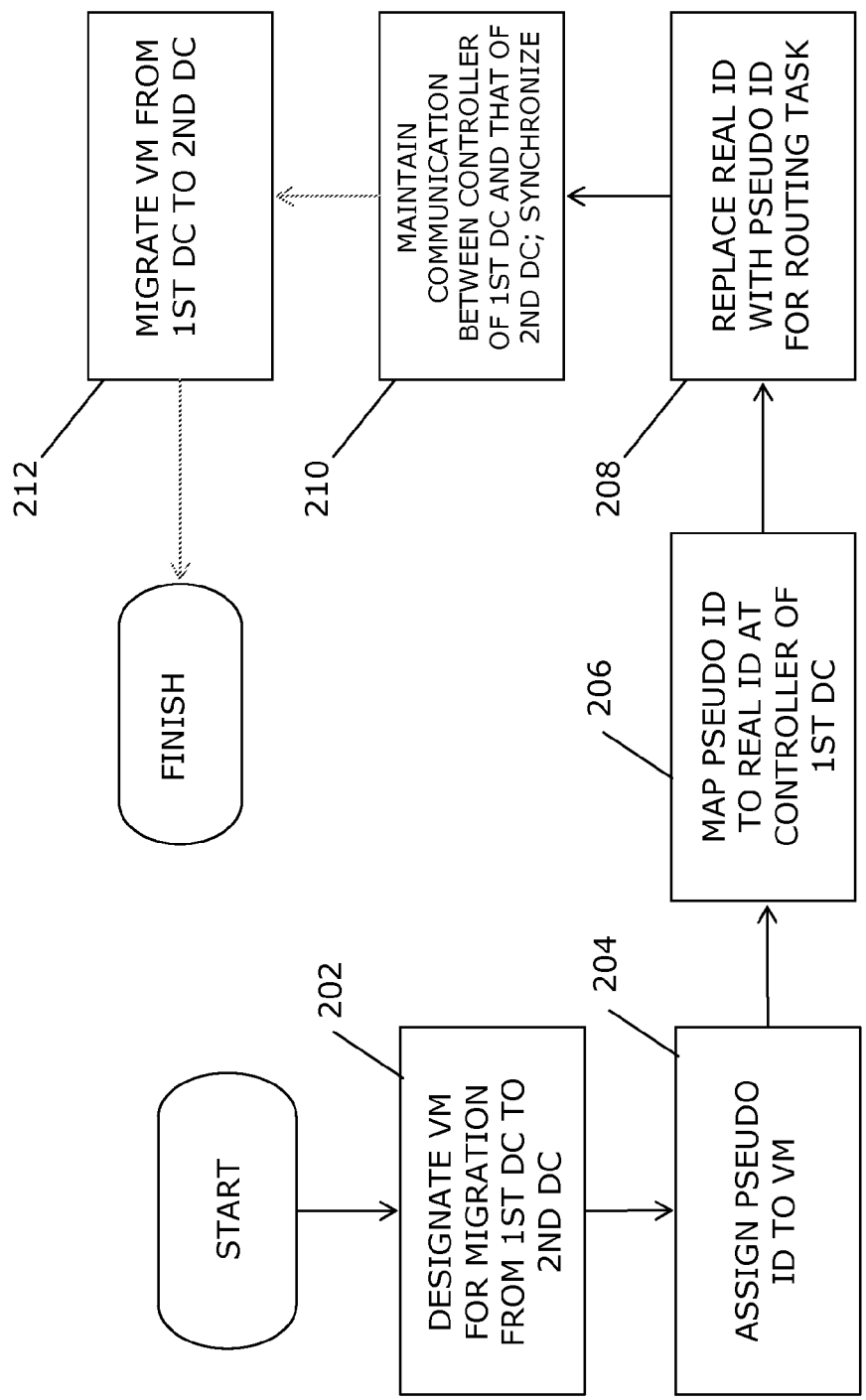
FIG. 2 sets forth a process more generally for facilitating virtual machine migration.

FIG. 2 sets forth a process more generally for facilitating virtual machine migration, in accordance with at least one embodiment of the invention. It should be appreciated that a process such as that broadly illustrated in FIG. 2 can be carried out on essentially any suitable computer system or set of computer systems, which may, by way of an illustrative and non-restrictive example, include a system such as that indicated at 12' in FIG. 3. In accordance with an example embodiment, most if not all of the process steps discussed with respect to FIG. 2 can be performed by way a processing unit or units and system memory such as those indicated, respectively, at 16' and 28' in FIG. 3

As shown in FIG. 2, a virtual machine is designated for migration from a first data center to a second data center, the virtual machine including a real identifier (202). A pseudo identifier is assigned to the virtual machine (204), and the pseudo identifier is mapped to the real identifier at a controller of the first data center (206). The real identifier is replaced in a data packet with the pseudo identifier for a routing task (208). Communication is maintained between the controller of the first data center and a controller of the second data center, and the controllers are synchronized to update a correct location of the virtual machine (210). The virtual machine is migrated from the first data center to the second data center (212).

Figure 3:
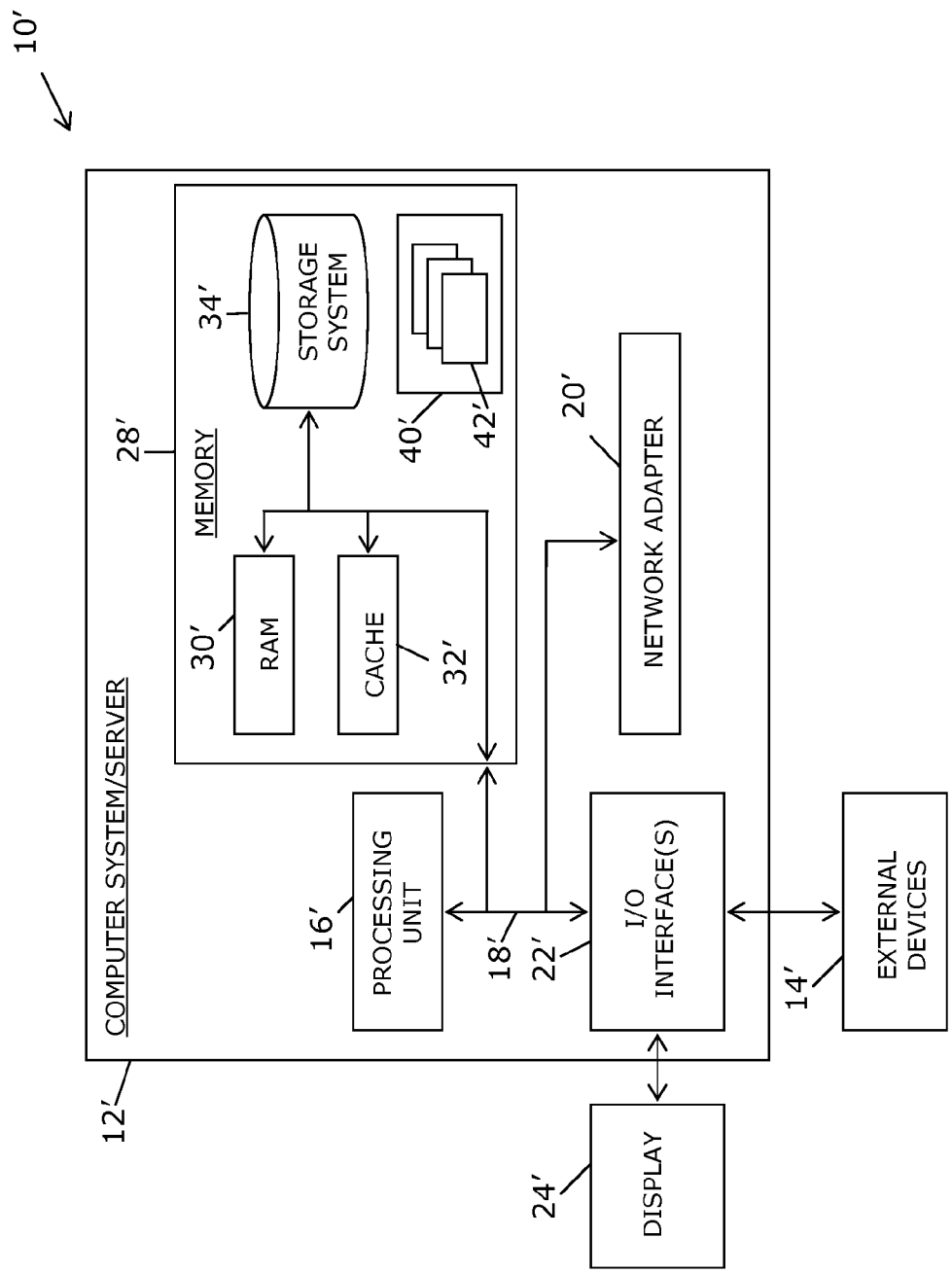
FIG. 3 depicts a computer system.

Referring now to FIG. 3, a schematic of an example of a cloud computing node is shown. Cloud computing node 10' is only one example of a suitable cloud computing node and is not intended to suggest any limitation as to the scope of use or functionality of embodiments of the invention described herein. Regardless, cloud computing node 10' is capable of being implemented and/or performing any of the functionality set forth hereinabove. In accordance with embodiments of the invention, computing node 10' may not necessarily even be part of a cloud network but instead could be part of another type of distributed or other network, or could represent a stand-alone node. For the purposes of discussion and illustration, however, node 10' is variously referred to herein as a "cloud computing node".

In cloud computing node 10' there is a computer system/server 12', which is operational with numerous other general purpose or special purpose computing system environments or configurations. Examples of well-known computing systems, environments, and/or configurations that may be suitable for use with computer system/server 12' include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12' may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12' may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system/server 12' in cloud computing node 10 is shown in the form of a general-purpose computing device. The components of computer system/server 12' may include, but are not limited to, at least one processor or processing unit 16', a system memory 28', and a bus 18' that couples various system components including system memory 28' to processor 16'.

Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that is accessible by computer system/server 12', and it includes both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' by way of example, and not limitation, as well as an operating system, at least one application program, other program modules, and program data. Each of the operating system, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enable a user to interact with computer system/server 12; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples, include, but are not limited to: microcode, device drivers, redundant processing units, external disk drive arrays, RAID systems, tape drives, and data archival storage systems, etc.

It should be noted that aspects of the invention may be embodied as a system, method or computer program product. Accordingly, aspects of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the invention may take the form of a computer program product embodied in at least one computer readable medium having computer readable program code embodied thereon.

Any combination of at least one computer readable medium may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having at least one wire, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the invention may be written in any combination of at least one programming language, including an object oriented programming language such as Java®, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. An apparatus comprising:
   at least one processor; and
   a non-signal computer readable storage medium having computer readable program code embodied therewith and executable by the at least one processor, the computer readable program code comprising:
   computer readable program code configured to designate a virtual machine for migration from a first data center to a second data center, the virtual machine including a real identifier;
   computer readable program code configured to assign a location-dependent pseudo identifier to the virtual machine that is disseminated using an address resolution protocol request message and that encodes a data center number, network topology and position of the virtual machine inside a given data center network;
   computer readable program code configured to map the pseudo identifier to the real identifier at a controller of the first data center;
   computer readable program code configured to replace the real identifier in a data packet with the pseudo identifier for a routing task;
   computer readable program code configured to maintain communication between the controller of the first data center and a controller of the second data center, and synchronize the controllers to update a correct location of the virtual machine; and
   computer readable program code configured to migrate the virtual machine from the first data center to the second data center.

2. A computer program product comprising:
   a non-signal computer readable storage medium having computer readable program code embodied therewith, the computer readable program code comprising:
   computer readable program code configured to designate a virtual machine for migration from a first data center to a second data center, the virtual machine including a real identifier;
   computer readable program code configured to assign a location-dependent pseudo identifier to the virtual machine that is disseminated using an address resolution protocol request message and that encodes a data center number, network topology and position of the virtual machine inside a given data center network;
   computer readable program code configured to map the pseudo identifier to the real identifier at a controller of the first data center;
   computer readable program code configured to replace the real identifier in a data packet with the pseudo identifier for a routing task;
   computer readable program code configured to maintain communication between the controller of the first data center and a controller of the second data center, and synchronize the controllers to update a correct location of the virtual machine; and
   computer readable program code configured to migrate the virtual machine from the first data center to the second data center.

3. The computer program product according to claim 2, wherein the pseudo identifier comprises a layer two pseudo identifier.

4. The computer program product according to claim 1, wherein the pseudo identifier comprises a layer three pseudo identifier.

5. The computer program product according to claim 2, wherein source traffic to the designated virtual machine originates from at least one taken from the group consisting of: within a layer two domain in which the virtual machine resides and across a layer three boundary.

6. The computer program product according to claim 2, wherein the pseudo identifier comprises at least one taken from the group consisting of: encoding relative to a data center in which the virtual machine resides and encoding relative to a position of the virtual machine within a data center.

7. The computer program product according to claim 2, wherein said computer readable program code is further configured to:
   undertake the replacing via one taken from the group consisting of: via address resolution protocol and via rules at a network ingress edge switch;
   route a data packet based on the pseudo identifier and replacing the pseudo identifier with the real identifier through rules at a network egress edge switch for routing the packet to a destination virtual machine;
   route a packet destined for a remote data center to an encapsulation switch that encapsulates a packet with a layer-3 address of a remote encapsulation switch and sends the packet over an existing network between data centers, wherein the remote encapsulation switch, upon receiving the packet, decapsulates the packet and routes the packet to a layer-2 switch; and
   map the pseudo identifier to the real identifier at a network controller within each data center.

8. The computer program product according to claim 7, wherein said computer readable program code is further configured to redirect an address resolution protocol request for a location-independent destination layer 3 real identifier to a controller, wherein the controller thereupon:
  returns the location dependent layer 2 pseudo identifier if the virtual machine is in the same network;
  returns a new layer 2 identifier if the virtual machine is in a different network, whereupon the new layer 2 identifier is subsequently used in the packet.

9. The computer program product according to claim 8, wherein said computer readable program code is further configured to install, via a controller, a rule on an ingress switch to replace a layer 3 real identifier with a layer 3 pseudo identifier and a rule on an egress switch to replace layer 2 and layer 3 pseudo identifiers with corresponding real identifiers.

10. The computer program product according to claim 7, wherein said computer readable program code is further configured to:
  broadcast, via a controller, an address resolution protocol request to a remote controller if a destination layer 3 real identifier is not in a mapping table; and
  via a remote controller, upon receiving an address resolution protocol broadcast message from a controller, consult a local mapping table and, if mapping is found, return location-dependent real layer 2 and layer 3 identifiers.

* * * * *